United States Patent [19]

Swartzendruber

[11] Patent Number: 4,476,811

[45] Date of Patent: Oct. 16, 1984

[54] ADJUSTABLE FEEDER WITH BROOD GATE

[75] Inventor: Ray E. Swartzendruber, Syracuse, Ind.

[73] Assignee: Chore-Time Equipment, Inc., Milford, Ind.

[21] Appl. No.: 428,847

[22] Filed: Sep. 30, 1982

[51] Int. Cl.³ .............................................. A01K 5/02
[52] U.S. Cl. .................................. 119/52 AF; 119/53
[58] Field of Search .................. 119/53, 52 AF, 51 R, 119/52 R, 51.11, 56 R

[56] References Cited

U.S. PATENT DOCUMENTS

| Re. 25,589 | 6/1964 | Hostetler et al. | 119/52 AF |
|---|---|---|---|
| 364,557 | 6/1887 | Walin | 119/53 |
| 570,569 | 11/1896 | Smith | 119/53 |
| 580,054 | 4/1897 | Merriman | 119/53 |
| 905,393 | 12/1908 | Webb | 119/53 |
| 984,980 | 2/1911 | Taylor | 119/53 |
| 1,069,943 | 8/1913 | Haffey | 119/52 R |
| 1,131,491 | 3/1915 | Drake | 119/53 |
| 1,565,117 | 12/1925 | Stabbert | 119/53 |
| 1,699,501 | 1/1929 | McCartney | 119/53 |
| 2,457,432 | 12/1948 | Ballard | 119/53 |
| 2,681,639 | 6/1954 | Littlefield | 119/57 |
| 2,709,417 | 5/1955 | Brembeck | 119/53 |
| 2,789,534 | 4/1957 | Landgraf | 119/52 R |
| 2,804,844 | 9/1957 | Gigliotti | 119/53 |
| 2,875,729 | 3/1959 | Gibson | 119/52 R |
| 2,884,899 | 5/1959 | Jackes et al. | 119/53 |
| 2,933,064 | 4/1960 | Geerlings | 119/53 |
| 2,941,506 | 6/1960 | Fulton | 119/53 |
| 3,085,552 | 4/1963 | Pilch | 119/52 AF |
| 3,102,511 | 9/1963 | Atcheson | 119/53 |
| 3,105,463 | 10/1963 | Pilch | 119/53 |
| 3,203,397 | 8/1965 | Henry | 119/53 |
| 3,211,131 | 10/1965 | Klein | 119/53 |
| 3,230,933 | 1/1966 | Myers et al. | 119/53 |
| 3,330,255 | 7/1967 | Scott et al. | 119/51.11 |
| 3,388,690 | 6/1968 | Hostetler | 119/53 |
| 3,389,689 | 6/1968 | Van Huis | 119/52 AF |
| 3,408,988 | 11/1968 | Lee | 119/53 |
| 3,476,087 | 11/1969 | Scott et al. | 119/53 |
| 3,485,215 | 12/1969 | Scott et al. | 119/51.11 |
| 3,490,419 | 1/1970 | Van Huis | 119/53 |
| 3,511,215 | 5/1970 | Myers | 119/53 |
| 3,547,082 | 12/1970 | Blessin et al. | 119/53 |
| 3,566,843 | 3/1971 | Van Huis et al. | 119/53 |
| 3,585,970 | 6/1971 | Scott | 119/53 |
| 3,628,505 | 12/1971 | Myers | 119/61 |
| 3,648,661 | 3/1972 | Moore | 119/53 |
| 3,675,627 | 7/1972 | Myers | 119/72 |
| 3,807,359 | 4/1974 | Hostetler | 119/52 AF |
| 3,811,412 | 3/1974 | Murto et al. | 119/53 |
| 3,908,601 | 9/1975 | Geary | 119/52 AF |
| 3,911,868 | 10/1975 | Brembeck | 119/53 |
| 3,971,340 | 7/1976 | Allen | 119/52 AF |
| 4,003,339 | 1/1977 | Hostetler | 119/52 AF |
| 4,070,990 | 1/1978 | Swartzendruber | 119/53 |

FOREIGN PATENT DOCUMENTS

| 20992 | 12/1924 | Australia . |
| 293106 | 1/1914 | Fed. Rep. of Germany . |
| 79029 | 11/1919 | Fed. Rep. of Germany . |
| 1285440 | 1/1961 | France . |

*Primary Examiner*—Hugh R. Chamblee
*Attorney, Agent, or Firm*—Trexler, Bushnell & Wolters, Ltd.

[57] ABSTRACT

A feeder for poultry and the like is disclosed. The feeder includes pan means for retaining and presenting delivered feed, and hollow drop tube means adapted to extend from a conveyor to a distal end adjacent the pan means. A first feed gate defined between the drop tube distal end and the pan permits feed to pass from the drop tube to an inner pan area for consumption by relatively mature poultry. A brood gate opening defined in the drop tube above its distal end permits feed to flow from the conveyor through at least part of the drop tube and out the brood gate opening to an outer portion of the pan for consumption by relatively immature poultry.

28 Claims, 9 Drawing Figures

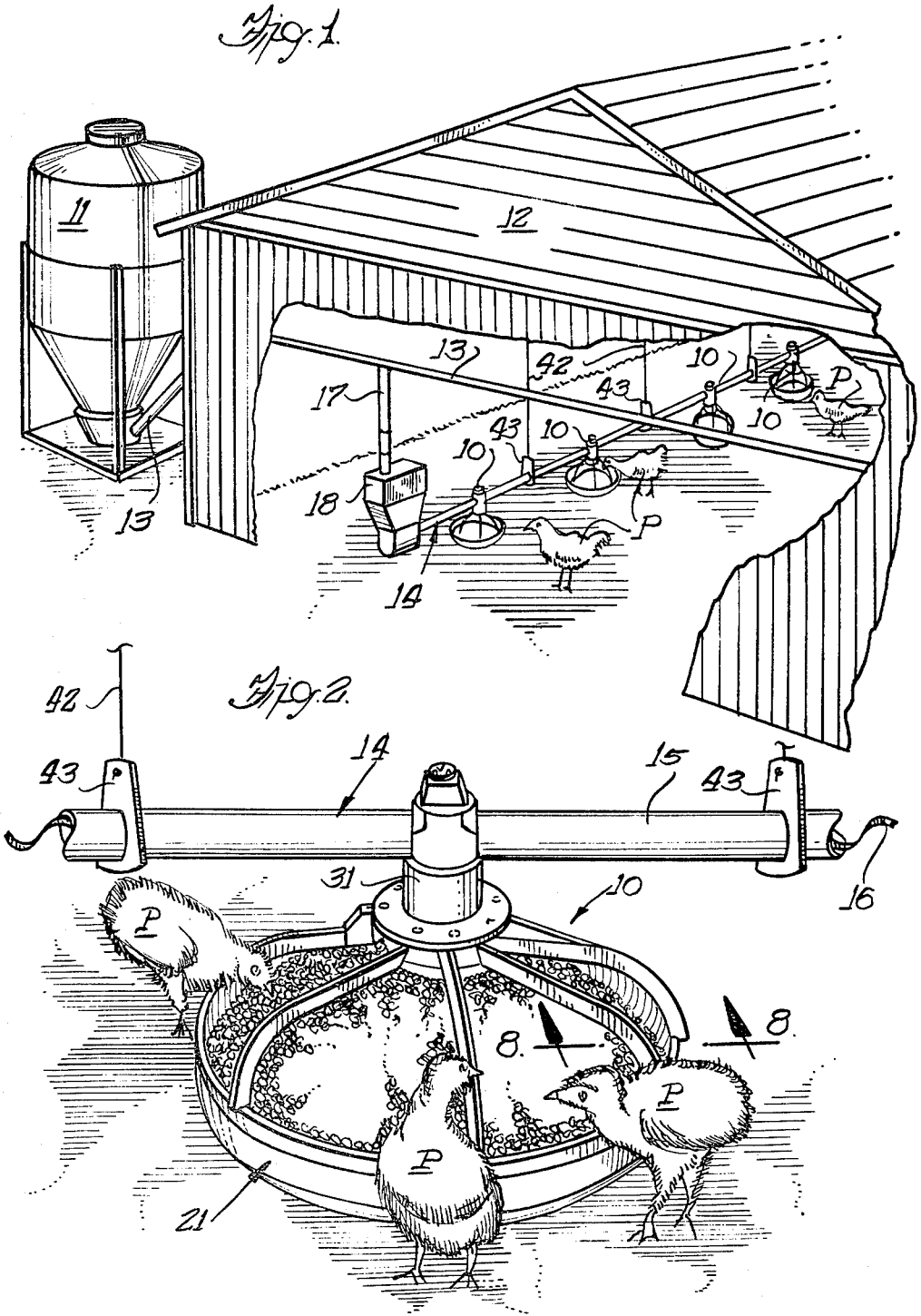

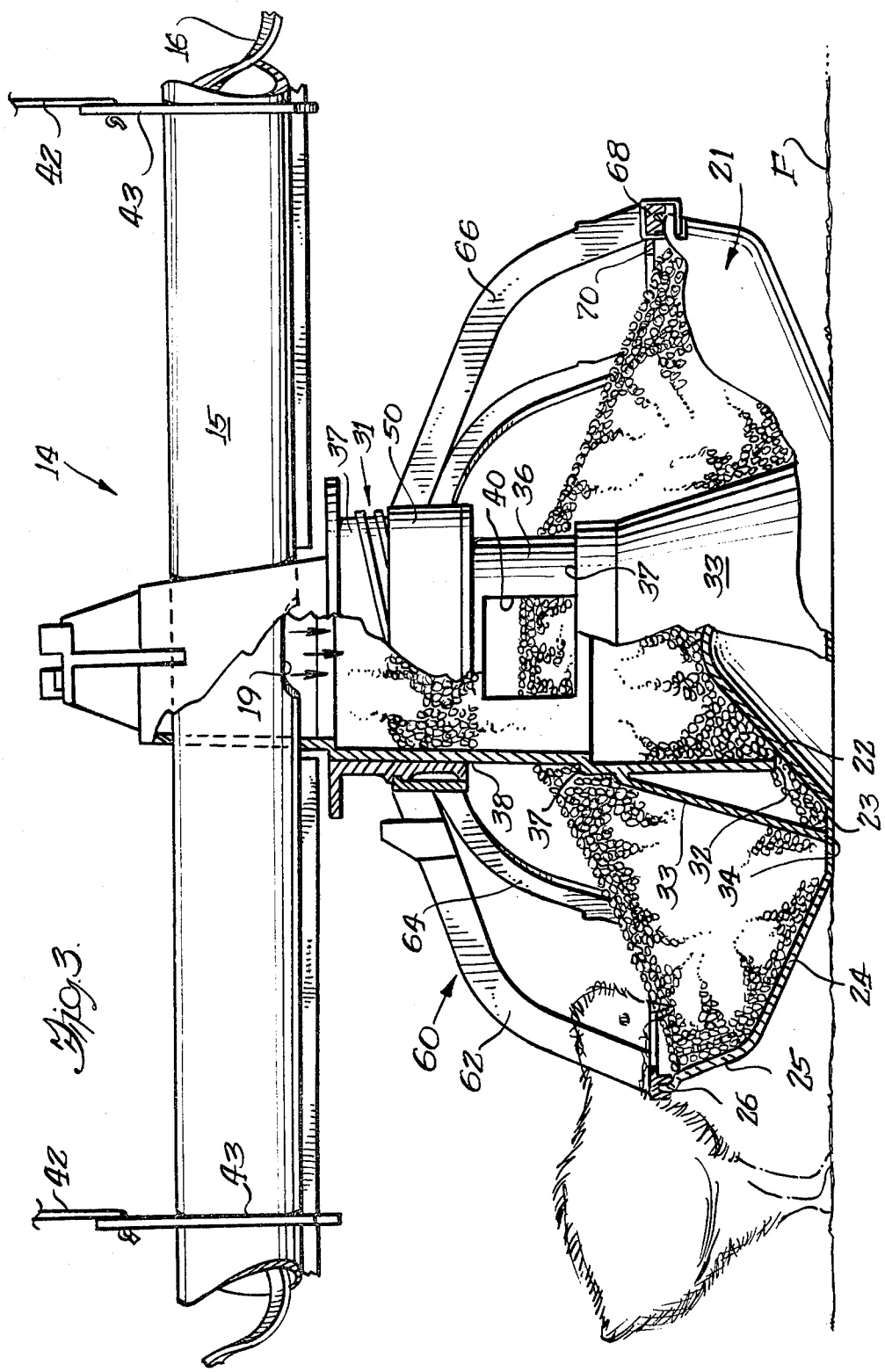

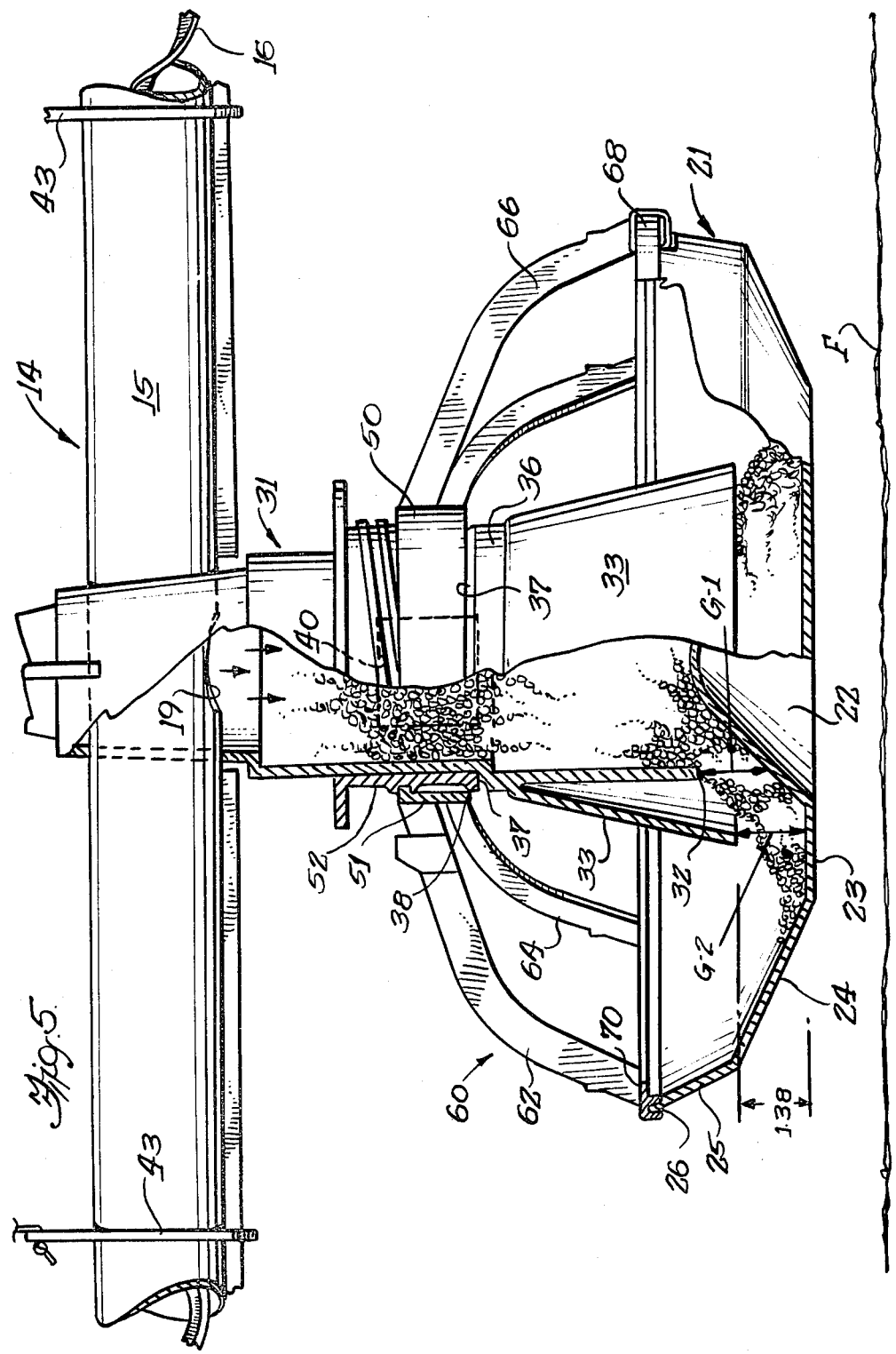

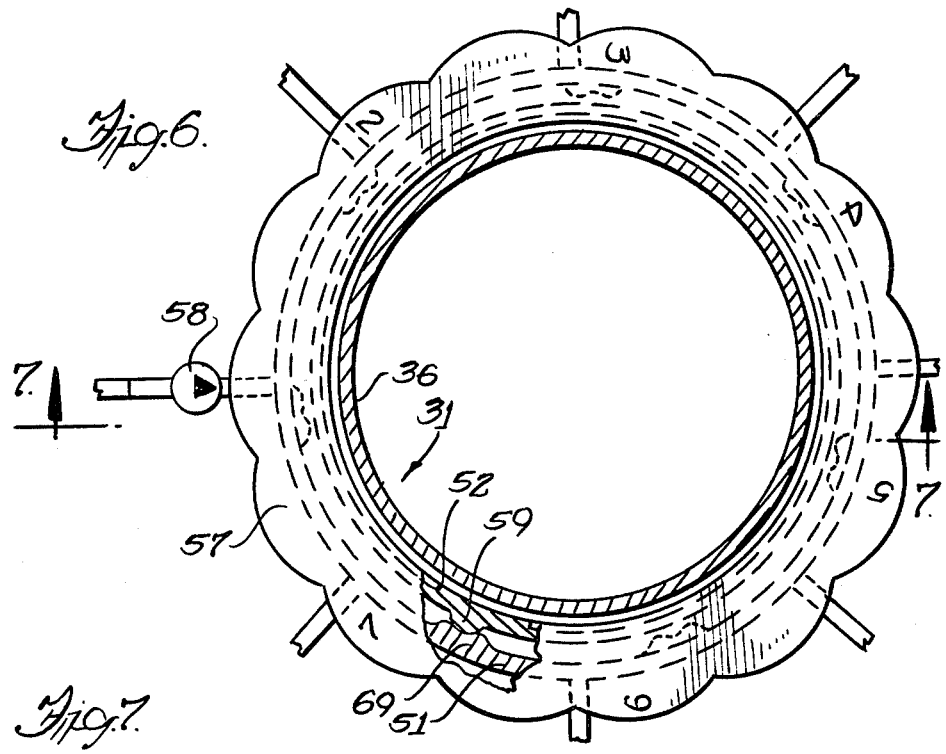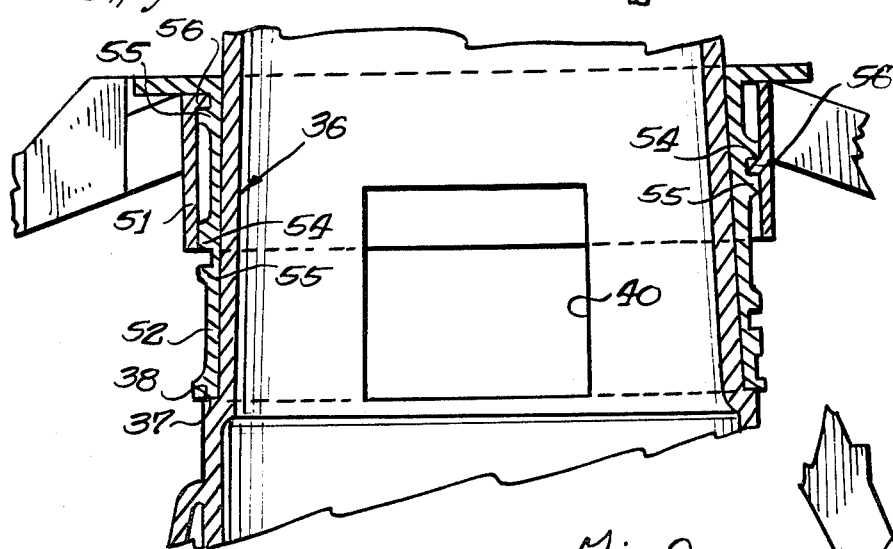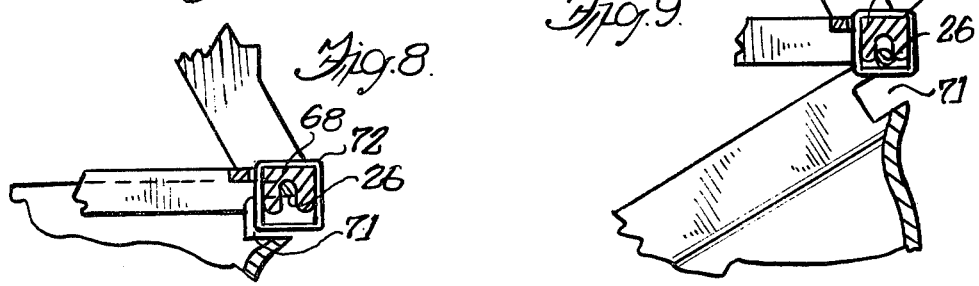

ADJUSTABLE FEEDER WITH BROOD GATE

BACKGROUND OF THE INVENTION

This invention relates to animal feeding systems, and more particularly relates to feeder pans for poultry and the like.

Automated feeding systems for poultry and like domestic animals have proved highly successful in modern animal husbandry operations. These systems can supply feed mixtures to a large poultry flock with minimum operator effort. Both the amounts of feed delivered and the proportions of feed ingredients can be regulated and this regulation permits the flock to be inexpensively raised from chicks to mature, commercially valuable broiler birds in a relatively short time.

Among the important parts of such automated feeding systems are the feeder units or feeder pans. These units receive feed flow from a feed conveyor, and are disposed on or near the poultry house floor to afford the birds ready access to the feed. Among the patents disclosing such feeders are U.S. Pat. Nos. 3,911,868 and 4,080,990, for example.

When raising broiler flocks, poultry husbandman traditionally introduce very young chicks to a poultry house, and provide feed for the chicks on paper, cardboard, or the like which are laid on the poultry house floor. After the chicks grow in size, they can be introduced feed contained in poultry feeders.

It is the general object of the present invention to provide a feeder unit which encourages, use from the day the small chicks are introduced into a poultry house through the day the adult birds are removed.

A more specific object is to offer a feeder unit which provides a configuration and mode of operation especially designed for small chicks, in which feed is presented at an exterior part of the feed pan. A corresponding object is to provide such a feeder which has another configuration and mode of operation for older birds, in which feed is presented at an interior part of the feed pan.

A related object is to provide a feeder which will change automatically from one configuration and operating mode to the other as the feeder is raised from and lowered to the poultry house floor.

Another object is to provide a feeder which can be adjusted so as to best accommodate any of various types of feed being delivered to older birds.

Still another object is to provide a feeder which minimizes or discourages feed wastage, spoilage, and befoulment.

A further object is to provide such a feeder which can be used over a long life with minimum repair and maintenance costs.

Other objects and advantages of the invention will become apparent upon reading the following detailed description and upon reference to the drawings. Throughout the description, like reference numerals refer to like parts.

BRIEF DESCRIPTION OF THE DRAWINGS

FIG. 1 is a perspective view showing a poultry house in which are installed several novel feeders of the present invention;

FIG. 2 is a perspective view showing in greater detail the novel feeder during its use by immature chicks;

FIG. 3 is a side elevational view in partial section showing the novel feeder and related apparatus as they appear when immature birds are being fed;

FIG. 5 is a side elevational view in partial section similar to FIGS. 3 and 4 but showing the feeder as it appears when adjusted for another type of feed;

FIG. 6 is a fragmentary sectional view taken substantially in the plane of line 6—6 in FIG. 4;

FIG. 7 is a fragmentary sectional view taken substantially in the plane of line 7—7 in FIG. 6;

FIG. 8 is a fragmentary sectional view taken substantially in the plane of line 8—8 in FIG. 2, showing portions of the feeder grill and pan as they appear when closed for use; and FIG. 9 is a fragmentary sectional view similar to FIG. 8 but showing the grill and pan as they appear when opened for cleaning.

DETAILED DESCRIPTION

Figure 4:
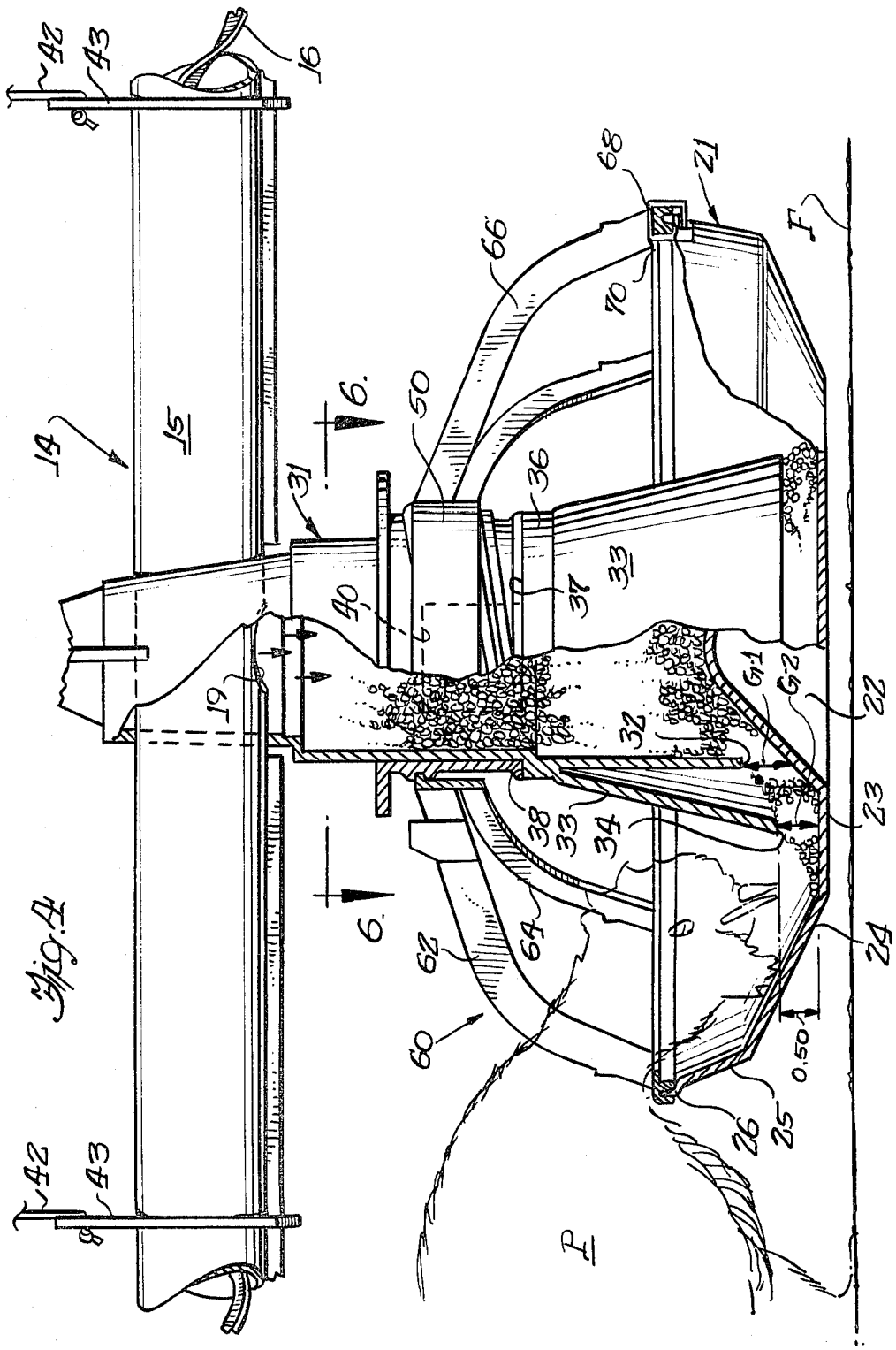
FIG. 4 is a side elevational view in partial section similar to FIG. 3 but showing the feeder as it appears when mature birds are being fed.

While the invention will be described in connection with a preferred embodiment, it will be understood that it is not intended to limit the invention to that embodiment. On the contrary, it is intended to cover all alternatives, modifications and equivalents as may be included within the spirit and scope of the invention.

Turning first to FIG. 1, there are shown several feeders 10 of the present invention as they appear when being used by poultry P. A feed storage bin 11 is located outside a poultry house 12, and a header conveyor 13 transports feed from the bin 11 to one or more cross or branch conveyors 14. As shown in FIGS. 2-5, these branch conveyors 14 include a conveyor tube 15, and a helical auger member 16 is disposed for rotation within the tube 15 by a motor (not shown). Header drop tubes 17 and intermediate hoppers 18 or other devices insure the correct delivery of feed from the header conveyor 13 to the branch conveyor 14 (FIG. 1).

A general examination of FIGS. 2-5 will show that the novel feeder 10 includes a pan means 21 for retaining and presenting delivered feed. This pan means 21 can be considered to include a central cone 22 and an adjacent inner portion 23, which here is oriented horizontally. A rising outer pan portion 24 leads to a steeper portion 25 and terminates in a pan rim 26.

A drop tube means 31 is adapted to extend from the conveyor 14 down into the pan 21. As can be envisioned from FIGS. 3-5, feed delivered by the conveyor 14 through a tube hole 19 falls down the interior of the drop tube assembly 31 and into the pan 21. Here, this drop tube assembly 31 terminates at a distal end 32. A skirt 33, of generally conical configuration, extends away from the main cylinder 36 of the drop tube means 31 to a skirt distal end 34. To minimize expense, the skirt 33 can be formed integral with the adjacent portions of the drop tube main cylinder 36.

A collar assembly 50 surrounds the drop tube 31, and is held above the pan 21 by grillwork 60. This grill means or grillwork 60 interconnects the collar 50 and pan means 21 so as to affix the collar 50 at a predetermined location above the pan. To this end, the grill means includes a plurality of spokes 62, 64, 66 extending outwardly from the collar, to a grill rim 68. The rim 68 interconnects the spokes at their outer end and continuously engages a mating rim 26 of the pan means 21.

In accordance with the invention, the illustrated feeder can be used to present feed to either immature poultry, or to older, larger, more mature birds. To accomplish this, a brood gate opening 40 is defined in the drop tube cylinder 36 above the drop tube means distal end 32 and above the top of the skirt 33. A relatively uniform quantity of feed can be provided around the entire circumference of the pan by defining two, three, or more feed brood gate openings in the drop tube means.

The drop tube means 31 is of sufficient vertical extent so that, when it is moved downwardly to a first non-pan-carrying position, the drop tube means distal end 32 and/or skirt means distal end 34 substantially engage the pan means 21, thereby inhibiting feed flow into the inner portion of the pan means from the bottom of the drop tube. Rather, feed is permitted to flow from the conveyor 14 through an upper interior portion 37 of the drop tube means 31, then out the exposed or unmasked brood gate opening 40, and then down the outside of the skirt means 33 to an outer pan area. By dispensing a relatively large amount of feed through the brood gate opening 40, the feed can be accumulated and displayed in the position and manner shown in FIG. 3 so that the immature poultry or chicks C can find it and consume it. Conveniently, this feeder configuration is obtained by permitting the pan 21 to rest on the poultry house floor F, and by permitting the drop tube 31 to slide down through the collar 50 so as to rest the distal ends 32 and 34 in the pan 21. As feed builds up in the pan 21, the brood gate opening 40 is covered; in this way, excessive feed delivery and buildup is discouraged, and feed wastage is inhibited.

After the chicks have grown for, say, five to ten days, they are able to reach interior portions of the feeder, and to obtain feed from even a slightly elevated pan. Accordingly, the drop tube 31 can be raised and the feeder automatically reconfigured for use by the more mature poultry. To reconfigure the feeder, the conveyor 14 is raised; here, this raising action is accomplished by drawing up the cables 42 and interconnecting hangars 43.

When the drop tube means 31 is raised into the second, pan-carrying positions shown in FIGS. 4 and 5, the brood gate opening 40 is masked by the collar means 50 and the drop tube and skirt distal ends 32 and 34 are pulled away from the pan 21. Under these circumstances, a first gate opening G-1 is defined between the drop tube distal end 32 and the pan means 21, and a second feed flow gate G-2 is defined between the skirt means distal end 34 and the pan means 21. Feed is thus permitted to flow from the conveyor 14 through upper and lower interior portions of the drop tube 31, then past the drop tube distal end 32, past the skirt distal end 34, and into an inner pan means area where it can be reached for consumption by the relatively mature poultry.

To dependingly support the grillwork 60 and pan 21 above the floor F, and to provide the gates G-1 and G-2, the drop tube cylinder 36 is provided with a shoulder 37. When the drop tube assembly 31 is pulled up, this shoulder 37 engages a bottom interior corner 38 of the collar 50. In use, the pan means 21 can be conveniently located at least a small distance above the poultry house floor F, as can be envisioned by comparing FIGS. 4 and 5 with FIG. 3. In this way, relatively small amounts of feed can be dispensed and displayed for consumption by the relatively mature poultry P. These birds have learned to eat from the pan, of course, and the design of the feeder unit inhibits raking, tossing, and wasting the feed.

In accordance with another aspect of the invention, the poultry feeder and the feed gates G-1 and G-2 can be adjusted so as to best accommodate any of various types of feed being delivered to the older birds. For example, relatively moist feed can be somewhat sticky in its consistency, and can require relatively large feed gate openings to accommodate proper dispensation. On the other hand, relatively dry feed requires relatively small feed gate openings to offer dispensation in a proper manner. To this end, then, the collar assembly 50 surrounding the drop tube includes a first screw cam element 51, which here constitutes an outer grill collar ring. A second screw cam element 52 is adapted to loosely surround the drop tube means central cylinder 36, as especially shown in FIGS. 3–5 and 7. The lower corner 38 of this element 52 directly engages the drop tube shoulder 37 when the drop tube 31 is pulled upwardly. Projections 54, 55 on the second cam element 52 form a helical cam track or female screw thread of extended pitch which engages a mating helical male thread projection 56 formed on the first cam element 51. As can be envisioned by comparing FIGS. 4 and 5, relative motion between the first and second screw cam elements 51, 52 causes the pan 21 to move up or down relative to the drop tube 31 and its shoulder 37 and the distal ends 32, 34. This relative motion causes consequent adjustment in the sizes of the first gate G-1 and second gate G-2. In this way, the poultryman can adjust the amount of feed which is presented in the inner portion of the pan to the consuming, mature poultry. It has been found that a minimum gate space of about ½ inch and a maximum gate space of about 1⅜ inch at the second gate G-2 provides a suitable variation so as to properly display and present a variety of types and amounts of feed. This gate variation is designed to accommodate variations in feed adhesive characteristics or consistency for a wide variety of feed formulations.

In carrying out the invention, the poultry husbandman can be provided with a clear indication of the gate settings. To do this, several reference numeral indicia can be applied around a collar top annular extension 57 adjacent the drop tube assembly 31 as shown in FIG. 6. An embossed indicator, such as an arrow symbol 58 can be formed on one of the spokes 62. By aligning the indicator 58 with a given indicia number on the collar 57, a feed gate space of known size can be provided.

To secure the screw cam elements in a selected given position, and consequently locate the feed gates G-1 and G-2 in desired positions or sizes, one or more embossments 59 can be formed on one of the screw cam elements 52, and a discrete series of mating recesses 69 can be formed on the other of the screw cam elements 51 to provide a more or less secure locking arrangement. When the embossments 59 and the recesses 69 are formed on confronting surfaces in the interior of the assembled screw cam 51, 52 as shown in FIG. 6, the arrangement minimizes the interference of dirt with the screw cam detent action.

As shown in FIGS. 6 and 7, the screw cam elements 51 and 52 are normally locked together, but the locked elements 51 and 52 can rotate freely about the encircled drop tube cylinder 36. Thus, the collar 50, grillwork 60 and pan 21 can rotate relative to the drop tube 31. If the poultry accidentally or intentionally cause this rotation, any feed bridges within the drop tube 31 or at the feed gates G-1 or G-2 can be broken, and temporarily pent-up feed will flow into the pan for consumption. A positive flow of feed is thus encouraged.

When the feeder is in use as shown in FIGS. 1–5, the grill rim 68 continuously engages the pan rim 26. To further discourage feed raking and tossing, an anti-rake grill rim extension 70 overlies the extreme outer portions of the pan 21. It is contemplated that the pan 21 and other feeder parts can be formed of a suitable resinous plastic such as Hercules 7523 polypropylene or Shell Chemical 7522 polypropylene by any of several known molding processes. By forming the anti-rake extension 70 on the grill rim 68, a difficult-to-accommodate undercut formation will be avoided in the pan molding design and process.

It is another feature of the invention that the feeder unit can be easily opened and cleaned after the flock has been removed from the poultry house. To this end, the pan 21 is provided with one or more slots 71 adjacent the pan rim 26, as shown in FIGS. 8 and 9. At one of these slots, a more or other convenient supplemental attachment 72 attaches the pan 21 to the grill rim 68 at but a single point. This permits the poultryman to raise the feeders from the floor, and pull or pivot the pan 21 away from the grill rim 68, as shown in FIG. 9. When the feeder is opened in this way, the unit can be easily, quickly and thoroughly cleaned.

The invention is claimed as follows:

1. A feeder for poultry and the like adapted to receive feed from a conveyor and to present the feed, alternatively, to immature poultry and to mature poultry, the feeder comprising, in combination, pan means for retaining and presenting delivered feed, drop tube means adapted to extend from the conveyor to a distal end above the pan means, at least one brood gate opening being defined in the drop tube means above the distal end, and means for alternatively masking and exposing the brood gate opening so as to permit feed flow, when the brood gate opening is exposed, from the conveyor through an upper interior portion of the drop tube means, thence out through the brood gate opening, and thence down the outside of the drop tube means to an outer pan means area for consumption by relatively immature poultry, and to alternatively permit feed flow, when the brood gate opening is masked, from the conveyor through upper and thence lower interior portions of the drop tube means and past the drop tube means distal end, the skirt means distal end and pan means together defining a first feed gate through which feed can pass to an inner pan means area for consumption by relatively mature poultry.

2. A feeder for poultry and the like adapted to receive feed from a conveyor and to present feed to poultry, the feeder comprising, in combination, pan means for retaining and presenting delivered feed, drop tube means adapted to extend from the conveyor to a distal end above the pan means, shoulder means defined on the drop tube means, and collar means affixed above the pan means and surrounding the drop tube means above the drop tube shoulder means so as to permit limited axial movement of the drop tube means relative to the collar means, the drop tube means, when axially lowered through the collar means to a first non-pan-carrying position, having its drop tube distal end engaging the pan means to inhibit feed flow past the drop tube means distal end and into the pan means, the drop tube means, when axially raised through the collar means to a second pan-carrying position, having its drop tube distal end located proximate to but spaced above the pan means, the drop tube means distal end and pan means thereby together defining a first feed gate for controlling feed flow from the drop tube means past the drop tube means distal end and into the pan means for consumption by poultry.

3. A feeder according to claim 1 wherein said means for alternately masking and exposing said brood gate opening includes collar means surrounding said drop tube means.

4. A feeder according to claim 2 wherein at least one brood gate opening is defined in the drop tube means above the drop tube means distal end.

5. A feeder according to claims 2 or 3 further including grill means extending from the pan means to said collar means.

6. A feeder according to claims 1 or 2 including skirt means extending downwardly and outwardly from said drop tube means to a distal end to define, with the pan means, a second feed gate through which feed can pass into the pan means for consumption by poultry.

7. A feeder according to claim 6 wherein said skirt means is affixed to said drop tube means, said second feed gate being automatically adjustable with said first feed gate.

8. A feeder according to claims 2 or 3 including screw cam means, the screw cam means having a first screw cam element affixed to said collar means, and a second screw cam element cooperable with said drop tube means, whereby relative motion of the first and second screw cam elements causes adjustment in the size of said first feed gate, and consequent adjustment into feed flow through the first feed gate.

9. A feeder according to claim 8 wherein said first screw cam element is formed integrally with said collar means.

10. A feeder according to claim 8 including detent means interposed between said first and said second screw cam element for securing the screw cam elements in any one of a discrete number of pre-selected positions.

11. A feeder according to claim 10 wherein said detent means includes embossment means formed on one of said screw cam elements, and a discrete series of mating recesses formed on the other of said screw cam elements.

12. A feeder according to claim 11 wherein said embossments and said recesses are formed on confronting surfaces in the interior of the assembled screw cam, so as to minimize the interference of screw cam detent action by dirt.

13. A feeder according to claim 8 wherein said screw cam elements together define a screw cam of extended pitch, whereby to provide a minimum first feed gate space of about ½ inch, and a maximum first feed gate space of about 1⅜ inch.

14. A feeder according to claim 13 wherein said screw cam has an extended pitch of substantially one inch.

15. A feeder for poultry and the like which is adapted to receive and present feed delivered by a conveyor, the feeder including, in combination, pan means for retaining and presenting delivered feed, hollow drop tube means adapted to extend from the conveyor to a distal end adjacent the pan means to define, with the pan means, a first feed gate through which feed can pass to an inner pan area for consumption by relatively mature poultry, a brood gate opening being defined in the drop tube means above the drop tube means distal end for permitting feed flow from the conveyor through at least part of the drop tube means and out the brood gate opening to outer pan means for consumption by relatively immature poultry.

16. A feeder according to claims 1 or 15 wherein a plurality of said brood gate openings are defined in said drop tube means.

17. A feeder for poultry according to claim 15 further including skirt means extending downwardly and outwardly from the drop tube means to a skirt distal end to define, together with the pan means, a second feed gate through which feed can pass to an inner portion of the pan means for consumption by relatively mature poultry, the skirt means also defining a feed-flow-directing shield to direct feed flow from the brood gate opening to an outer portion of the pan means for consumption by relatively immature poultry.

18. A feeder according to claim 15 further including collar means surrounding the drop tube means but permitting the drop tube means to move with limited axial motion therethrough so as to cause the brood gate opening in the drop tube means to be alternately exposed and masked by the collar means.

19. A feeder according to claim 18 wherein at least one of said drop tube means and skirt means are of sufficient vertical extent so that, when the drop tube means is moved relative to the collar means so as to expose the brood gate opening, the drop tube means distal end and/or skirt means distal end substantially engages the pan means, thereby inhibiting feed flow into the inner portion of the pan means.

20. A feeder according to claim 18 further including grill means interconnecting the collar means and pan means so as to affix the collar means at a predetermined location above the pan means.

21. A feeder according to claim 20 wherein said grill means includes a plurality of spokes extending outwardly from the collar means, and grill rim means interconnecting the spokes at their outer ends and adapted to continuously engage a rim of the pan means.

22. A feeder according to claim 20 wherein said drop tube means is provided with shoulder means adapted to engage said collar means, whereby said grill means and said pan means can be dependingly supported from said drop tube means.

23. A feeder according to claim 21 wherein said pan means includes temporary, supplemental attachment means for attaching said pan means to said grill rim means at but a single point, whereby to permit said pan means to be pivoted away from said grill means for feeder cleaning.

24. A feeder according to claim 21 wherein said grill rim means includes inwardly extending anti-rake extension means.

25. A feeder according to claim 18 wherein said collar means freely surrounds the drop tube means to permit rotation movement of the collar means and pan means relative to the drop tube means, whereby feed bridging in the feeder is discouraged.

26. A feeder for poultry and the like adapted to receive feed from a conveyor and to present the feed, alternatively, to immature poultry and to mature poultry, the feeder comprising, in combination, pan means for retaining and presenting delivered feed, drop tube means adapted to extend from the conveyor to a distal end above the pan means, at least one brood gate opening being defined in the drop tube means above the distal end, and means for alternatively masking and exposing the brood gate opening so as to permit feed flow, when the brood gate opening is exposed, from the conveyor through an upper interior portion of the drop tube means, thence out through the brood gate opening, and thence down the outside of the drop tube means to an outer pan means area so as to provide a feed pile visible to and accessible for consumption by relatively immature poultry.

27. A feeder according to claim 26 wherein said pan means includes an outer portion and rim of low aspect to permit immature poultry to see the feed pile from the normal point of view of the immature poultry on a poultry house floor.

28. A feeder for poultry and the like which is adapted to receive and present feed delivered by a conveyor, the feeder including, in combination, pan means having a low rim for retaining and presenting delivered feed, hollow drop tube means adapted to extend from the conveyor to a distal end adjacent the pan means to define, with the pan means, a first feed gate through which feed can pass to an inner pan area for consumption by relatively mature poultry, a brood gate opening being defined in the drop tube means above the drop tube means distal end for permitting feed flow from the conveyor through at least part of the drop tube means and out the brood gate opening to form a feed pile in outer pan means so as to be visible to and consumed by relatively immature poultry.

* * * * *